(12) United States Patent
Hinsey

(10) Patent No.: US 7,545,795 B2
(45) Date of Patent: Jun. 9, 2009

(54) METHOD FOR IDENTIFICATION USING BLUETOOTH WIRELESS KEY

(75) Inventor: James R. Hinsey, Colorado Springs, CO (US)

(73) Assignee: Broadcom Corporation, Irvine, CA (US)

( * ) Notice: Subject to any disclaimer, the term of this patent is extended or adjusted under 35 U.S.C. 154(b) by 489 days.

(21) Appl. No.: 10/911,866

(22) Filed: Aug. 5, 2004

(65) Prior Publication Data

US 2006/0029015 A1  Feb. 9, 2006

(51) Int. Cl.
*H04J 3/06* (2006.01)
(52) U.S. Cl. .................. 370/350; 370/329; 370/335; 370/337; 370/395.3; 455/41.2; 340/10.1
(58) Field of Classification Search .............. 370/350, 370/329, 335, 337, 395.3, 342; 455/41.2; 235/486; 340/10.1, 10.42
See application file for complete search history.

(56) References Cited

U.S. PATENT DOCUMENTS

| | | | |
|---|---|---|---|
| 5,339,239 A * | 8/1994 | Manabe et al. ............ 705/1 |
| 6,732,278 B2 * | 5/2004 | Baird et al. ............... 726/7 |
| 6,788,938 B1 * | 9/2004 | Sugaya et al. ............ 455/435.1 |
| 6,892,052 B2 * | 5/2005 | Kotola et al. ............. 455/41.2 |
| 6,986,030 B2 * | 1/2006 | Shmueli et al. ........... 713/1 |
| 7,020,456 B2 * | 3/2006 | Smeets et al. ............ 455/411 |
| 7,039,440 B2 * | 5/2006 | Rodriguez et al. ........ 455/558 |
| 7,146,191 B2 * | 12/2006 | Kerner et al. ............ 455/558 |
| 2003/0036350 A1 * | 2/2003 | Jonsson et al. ........... 455/41 |
| 2004/0014422 A1 * | 1/2004 | Kallio ...................... 455/41.1 |
| 2005/0048919 A1 * | 3/2005 | Jeannerod ................ 455/41.2 |
| 2005/0257052 A1 * | 11/2005 | Asai et al. ................ 713/166 |
| 2006/0029015 A1 * | 2/2006 | Hinsey ..................... 370/328 |

* cited by examiner

*Primary Examiner*—Matthew D Anderson
*Assistant Examiner*—Minh D Dao
(74) *Attorney, Agent, or Firm*—Garlick Harrison & Markison; James A. Harrison

(57) ABSTRACT

A Bluetooth host solves the aforementioned problems by evaluating a Bluetooth service provider server ID and by determining which of a plurality of access IDs map to the server ID and, correspondingly, providing a Bluetooth access ID that corresponds thereto. Accordingly, one Bluetooth host may readily gain access to any one of a plurality of different devices and different types of devices. Additionally, the Bluetooth host includes capacity to store and provide additional supporting information according to the type of device that is the Bluetooth service provider. Generally, the Bluetooth host stores a plurality of access or link IDs in relation to a plurality of master device IDs and, upon detecting a beacon, determines what access or link ID to provide and whether to provide additional stored information.

30 Claims, 6 Drawing Sheets

FIG. 1 prior art Bluetooth piconet

FIG. 2  Bluetooth piconets for one host

METHOD FOR IDENTIFICATION USING BLUETOOTH WIRELESS KEY

BACKGROUND

1. Technical Field

This invention relates generally to communication systems and, more particularly, to Radio Frequency (RF) signal amplification within wireless devices operating in wireless communication systems.

2. Related Art

Communication systems are known to support wireless and wire-lined communications between wireless and/or wired communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), wireless application protocol (WAP), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel of the other parties (e.g., one of a plurality of radio frequency (RF) carriers of the wireless communication system) and exchange information over that channel. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network (PSTN), via the Internet, and/or via some other wire-lined or wireless network.

Each wireless communication device includes a built-in radio transceiver (i.e., receiver and transmitter) or is coupled to an associated radio transceiver (e.g., a station for in-home and/or in-building wireless communication networks, RF modem, etc.) to participate in wireless communications. As is known, the receiver receives RF signals, removes the RF carrier frequency from the RF signals via one or more intermediate frequency stages, and demodulates the signals in accordance with a particular wireless communication standard to recapture the transmitted data. The transmitter converts data into RF signals by modulating the data in accordance with the particular wireless communication standard and adds an RF carrier to the modulated data in one or more intermediate frequency stages to produce the RF signals.

As is also known, the receiver is coupled to an antenna and includes a low noise amplifier (LNA), zero or more intermediate frequency stages, a filtering stage, and a data recovery stage in many designs. The low noise amplifier receives an inbound RF signal via the antenna and amplifies it. Down converters mix the amplified RF signal with one or more local oscillations to convert the amplified RF signal into a baseband signal or an intermediate frequency (IF) signal. As used herein, the term "low IF" refers to both baseband and low intermediate frequency signals. A filtering stage filters the low IF signals to attenuate unwanted out of band signals to produce a filtered signal. The data recovery stage recovers raw data from the filtered signal in accordance with the particular wireless communication standard.

As the demand for enhanced performance (e.g., reduced interference and/or noise, improved quality of service, compliance with multiple standards, increased broadband applications, etc.), smaller sizes, lower power consumption, and reduced costs increases, wireless communication device engineers are faced with a very difficult design challenge to develop such a wireless communication device.

Bluetooth is a standard for providing a wireless solution to cables that are used to couple electrical devices to each other. Generally, Bluetooth may be used to replace cabling between computers, printers, and other computer peripheral devices, as well as peripheral devices for other systems, such as mobile phones, etc. Generally, a Bluetooth radio device up-converts data typically carried on a cable to an RF frequency for transmission to an RF receiver. Accordingly, Bluetooth is facilitating the use of RF-based keyboards, mice, headsets, etc. One advantage of Bluetooth is that its low power consumption gives long battery life for cordless devices that are generally portable. Significant aspects of Bluetooth include its robustness, low complexity, low power, and low cost. Moreover, Bluetooth systems are designed to operate in noise environments and are operable to perform frequency hopping to make a link robust. A Bluetooth device typically includes a radio that transmits and receives the RF frequency signals at a 2.4 GHz frequency band. A Bluetooth device may further include a baseband processor that performs low level link routines and executes baseband protocols. The baseband processor includes logic to establish a link, provide access to hardware for the Bluetooth device through a host controller interface and supports higher level protocol multiplexing, packet segmentation and reassembly, and the conveying of quality of service information.

Another protocol embedded in a Bluetooth device is a service discovery protocol (SDP) which provides a method for two Bluetooth devices to communicate and to discover what services may be provided by either or both of the Bluetooth devices. It further allows the devices to determine what characteristics of the available services exist. Service discovery protocol is a simple protocol that uses a request/response model wherein each transaction includes a request protocol data unit and a response protocol data unit. In some applications, the requests and responses may be pipelined. Every SDP packet data unit includes a packet data unit header followed by packet data unit specific parameters. The header, more specifically, includes three fields: a PDU ID field, which identifies the type of PDU (its meaning and the specific parameters, a transaction ID field that uniquely identifies request PDUs and is used to match response PDUs to request PDUs, and a parameter link field that specifies the link of all parameters contained in the PDU.

One key aspect of SDP is to allow Bluetooth devices to discover what services other Bluetooth devices can offer. Typically, a Bluetooth device will search for a specific service and, upon detecting another Bluetooth device, will browse to determine what services may be offered by the other Bluetooth device.

Current technology for authentication for access to a device, to an entry point, or to authenticate a transaction, has always required a user to input a user name or ID, a password, or a type of biometric input that allows validation. Such techniques have generally been considered reliable though they are at times cumbersome and can even result in long lines of people waiting to access an entry point or device. For example, in a workplace, lines to enter the facility at a designated time may be quite long because each person must enter his or her own user ID. While Bluetooth offers some relief to such a scenario, for example, so-called Bluetooth RF ID in which a single identify code is stored in the Bluetooth device, the access is limited only to the service provider that corresponds to the particular access ID. Thus, while an employee might use a badge with a Bluetooth RF ID to gain access to a particular doorway, the employee would then have to manually enter IDs or carry additional Bluetooth devices with RF IDs.

FIG. 1 is a functional block diagram of a prior art Bluetooth piconet comprising an RF ID system. As may be seen, a Bluetooth host 02 is operatively coupled to communicate with a Bluetooth service provider 04. In a system in which the Bluetooth service provider is a Bluetooth master, the Bluetooth host would seek a beacon produced by the master and would reply to the beacon to gain access over an RF frequency. As a part of establishing a link between the Bluetooth host 02 and the Bluetooth service provider 04, the Bluetooth host 02 provides a secure RF ID to the Bluetooth service provider 04. In a typical system, the ID is stored permanently in a permanent memory register coupled to a processor which then provides the ID to a Bluetooth radio transceiver that transmits the RF ID to the Bluetooth service provider 04 for authentication. Such a device is advantageous in that it removes a need for a user of the Bluetooth host 02 to manually enter a user name, password, or other type of ID, but is disadvantageous in that the user must have a Bluetooth host 02 for every device or point-of-entry to which the user seeks access without having to manually enter authentication information.

Generally, to avoid having to manually enter an ID, an individual would have to carry a Bluetooth device with an RF ID capability for each system or entry point to which he or she desires access. What is needed, therefore, is a system and method that provides seamless access to differing types of devices and entryways.

SUMMARY OF THE INVENTION

A Bluetooth host solves the aforementioned problems by evaluating a Bluetooth service provider server ID and by determining which of a plurality of access IDs map to the server ID and, correspondingly, providing a Bluetooth access ID that corresponds thereto. Accordingly, one Bluetooth host may readily gain access to any one of a plurality of different devices and different types of devices. Accordingly, a need is eliminated for a user to include a plurality of Bluetooth hosts, one for each device or entry point to which the user desires access.

Additionally, the Bluetooth host includes capacity to store and provide additional supporting information according to the type of device that is the Bluetooth service provider. For example, if the Bluetooth service provider is a point-of-sale machine, the Bluetooth host would not only provide an appropriate and corresponding access ID, but would also provide other necessary information such as, in one embodiment of the invention, bank account information. Additionally, if desired, the Bluetooth host may even provide PIN information to make the transaction completely hands free. If, on the other hand, the Bluetooth service provider is a point-of-entry, then the Bluetooth host may only need to provide a link key and, optionally, an access code, to gain access to the point-of-entry.

In another embodiment, the Bluetooth host may include password information if the Bluetooth service provider is a computer device to enable the user to gain access to the computer. In this specific embodiment, the computer may limit access according to permissions granted to the specific Bluetooth host. Accordingly, different Bluetooth hosts may gain different levels of access to the computer host that acts as a Bluetooth service provider. In another embodiment of the present invention, the Bluetooth host may include private and personal information that may be uploaded to emergency personnel. Accordingly, if the Bluetooth server ID is one that corresponds to an emergency service provider, then the Bluetooth host may upload critical information about the user, such as medical history.

Finally, in one embodiment of the invention, the Bluetooth may upload necessary information to a device to gain access and to gain usage thereof. For example, if the Bluetooth service provider is an automobile, the Bluetooth host may not only generate access IDs to gain access to the automobile, but perhaps user settings, such as seat, mirror and radio adjustments or selections.

The Bluetooth host may be formed in a plurality of different housings. For example, the Bluetooth host may be formed in a badge, a watch, a pin, a smart credit card (credit card with included operational logic), a key, a cell phone, decorative jewelry, an automobile or other vehicle, or any other portable device. Moreover, the Bluetooth host, with the abilities to access a plurality of Bluetooth service providers, may include additional supporting hardware. For example, the Bluetooth host may be formed in a portable USB drive that may wirelessly upload information from a Bluetooth service provider such as the PC host described above.

BRIEF DESCRIPTION OF THE DRAWINGS

A better understanding of the present invention can be obtained when the following detailed description of the preferred embodiment is considered with the following drawings in which.

DETAILED DESCRIPTION

Figure 1:
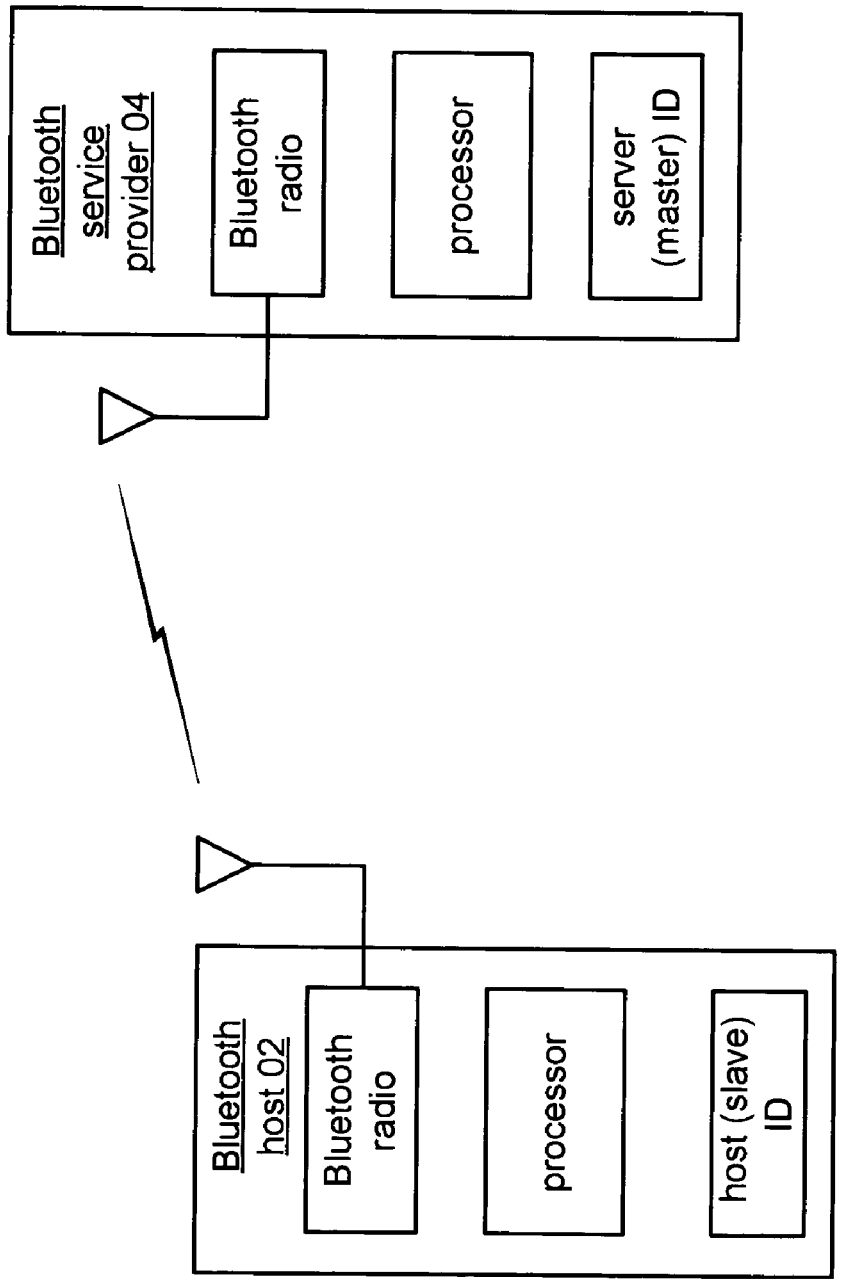
FIG. 1 is a functional block diagram of a Bluetooth RF ID system.
Figure 2:
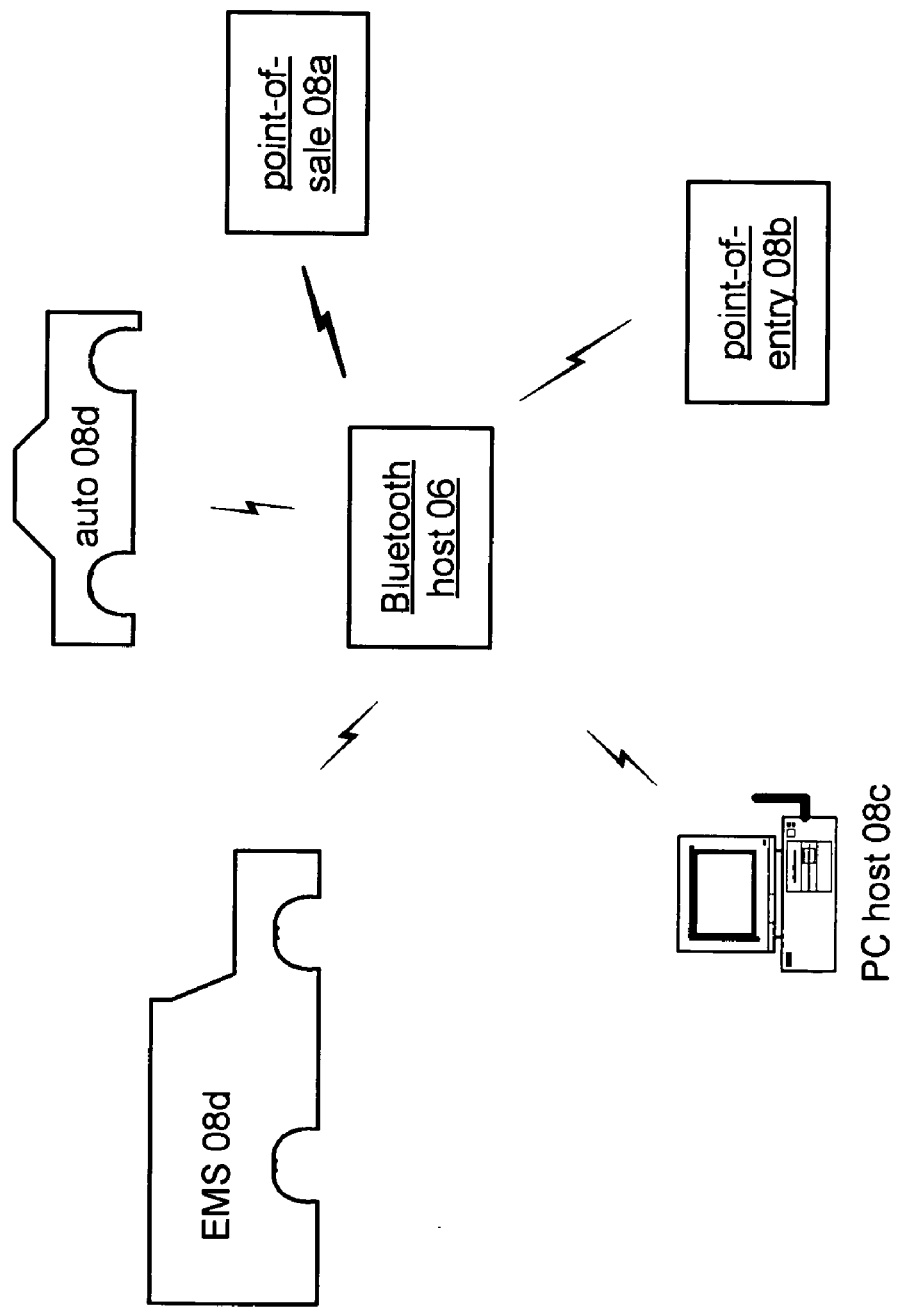
FIG. 2 is a functional block diagram of a Bluetooth host formed according to one embodiment of the invention that is operatively coupled to communicate with a plurality of devices.

FIG. 2 is a functional block diagram of a Bluetooth host formed according to one embodiment of the invention that is operatively coupled to communicate with a plurality of devices. As may be seen, referring to FIG. 2, a Bluetooth host 06 may operatively couple to communicate with any one of a plurality of different Bluetooth service providers 08. For example, Bluetooth host 06 may operatively communicate with a point-of-sale terminal 08a, a point-of-entry 08b, a computer terminal 08c, an emergency service provider 08d, or an automobile 08e. It is recognized that each one of the devices with which Bluetooth host 06 communicates, may require a different ID or a different type of ID by Bluetooth host 06 in order to provide access thereto. Accordingly, as will be described in greater detail below, Bluetooth host 06 includes circuitry and logic for storing a plurality of access IDs and, if necessary, additional corresponding information to provide to the Bluetooth service provider 08a-08e. As is known by one of average skill in the art, Bluetooth access IDs often are in the form of link keys which may be comprised of combination keys, unit keys, master keys, or initialization keys.

A combination key is one which is derived from information from the Bluetooth host 06 and the Bluetooth service provider 08a-08e. The unit key is generated in a single Bluetooth host when the key is installed to correspond with a particular Bluetooth service provider 08a-08e. A master key is a temporary key which replaces a current link key. A master key is typically used by a master unit for transmitting information to more than one Bluetooth host. The initialization key is used as a link key during an initialization process when there are not yet any unit or combination keys to facilitate a Bluetooth communication link. An initialization key is only used during installation of a Bluetooth host.

Figure 3:
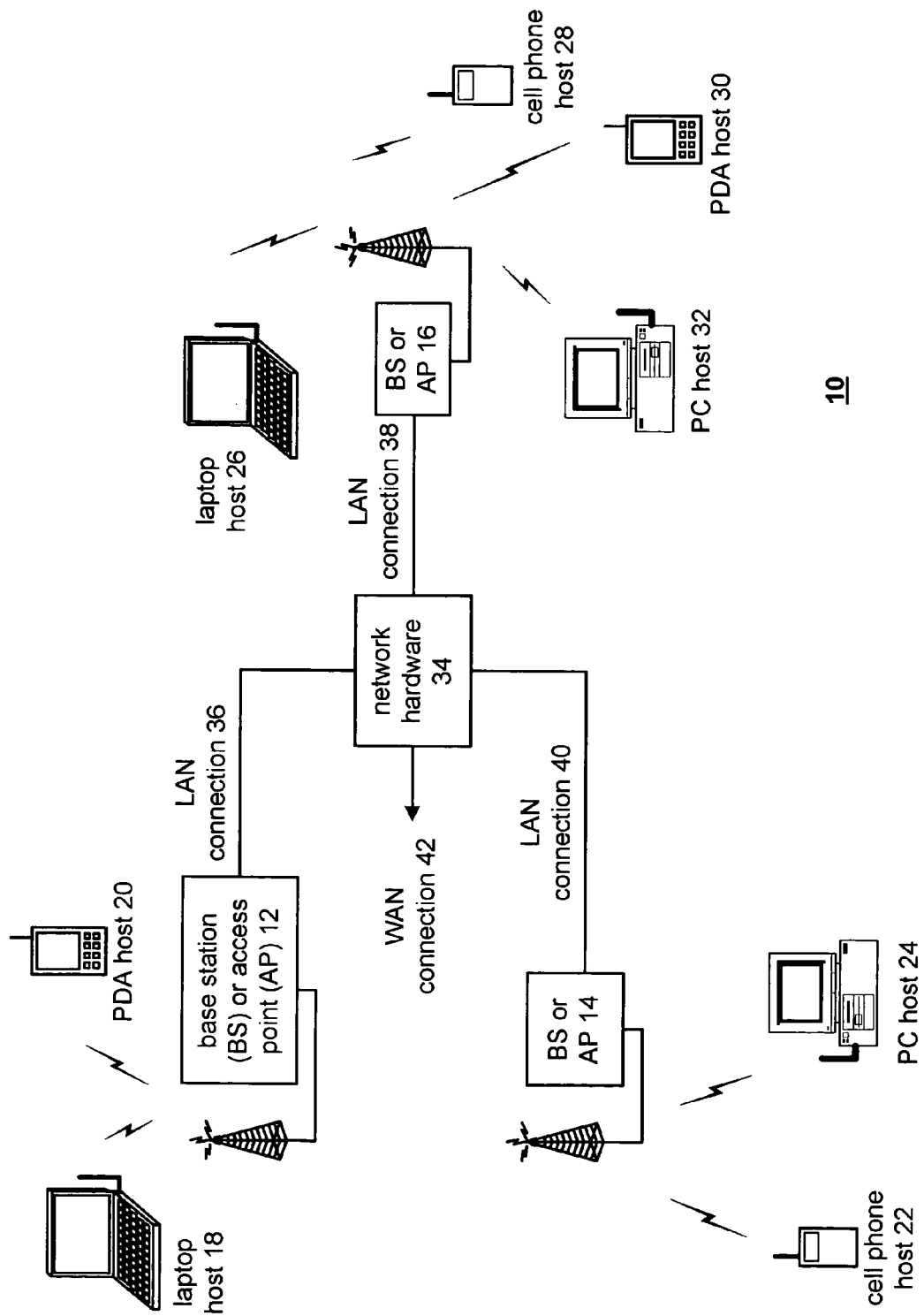
FIG. 3 is a schematic block diagram illustrating a communication system that includes a plurality of base stations or access points, a plurality of wireless communication devices and a network hardware component.

FIG. 3 is a schematic block diagram illustrating a communication system 10 that includes a plurality of base stations or access points 12-16, a plurality of wireless communication devices 18-32 and a network hardware component 34. Any one of the wireless communication devices may include an integrated temperature sensor formed according to an embodiment of the invention. The plurality of wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 4.

The base stations or access points 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10. Each of the plurality of base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio may include a highly linear amplifier and/or programmable multi-stage amplifier as disclosed herein to enhance performance, reduce costs, reduce size, and/or enhance broadband applications.

Figure 4:
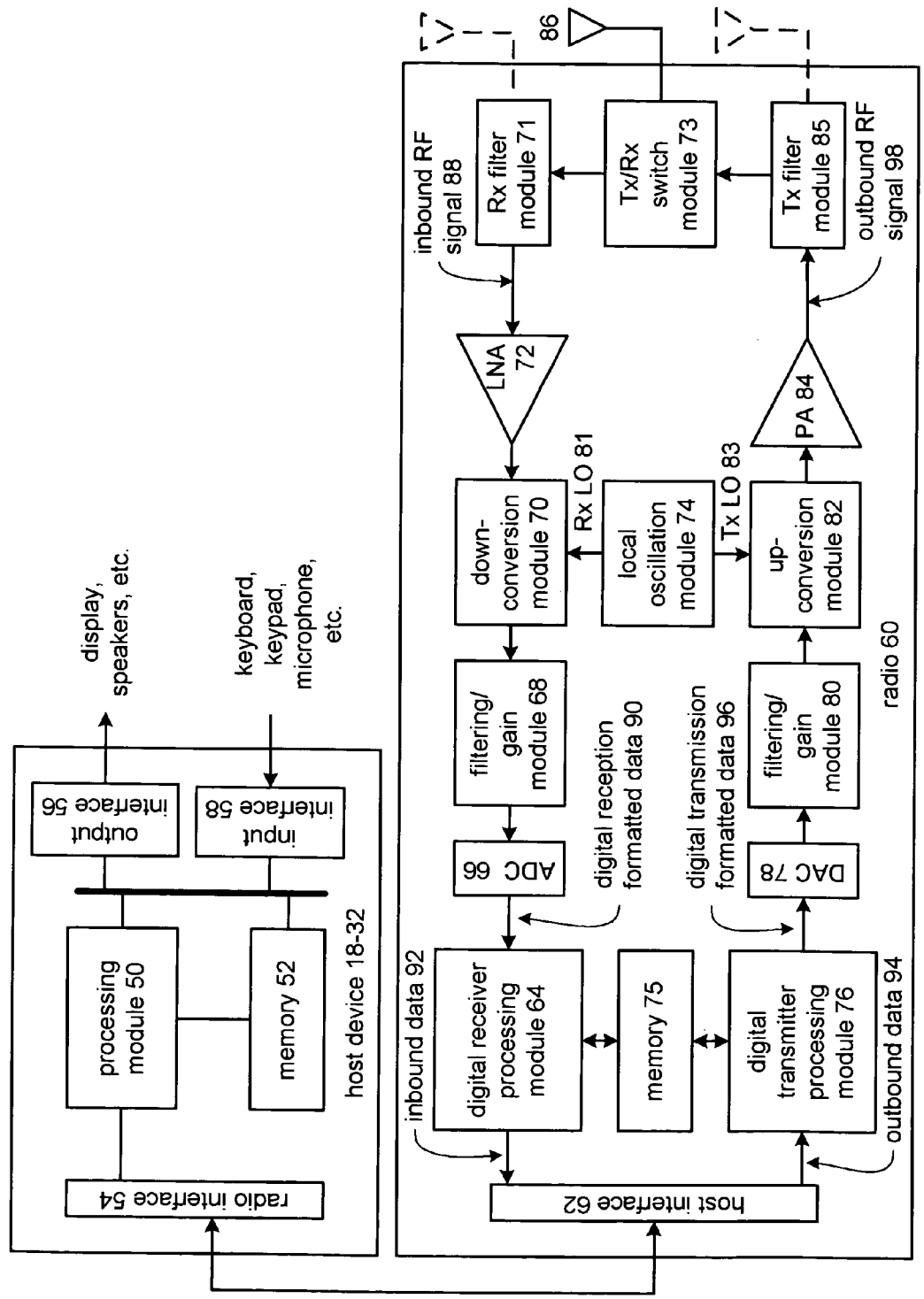
FIG. 4 is a schematic block diagram illustrating a wireless communication device that includes the host device and an associated radio.

FIG. 4 is a schematic block diagram illustrating a wireless communication device that includes the host device 18-32 and an associated radio 60. For cellular telephone hosts, the radio 60 is a built-in component. For personal digital assistant hosts, laptop hosts, and/or personal computer hosts, the radio 60 may be built-in or an externally coupled component.

As illustrated, the host device 18-32 includes a processing module 50, memory 52, a radio interface 54, an input interface 58 and an output interface 56. The processing module 50 and memory 52 execute the corresponding instructions that are typically done by the host device 18-32. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a receiver (Rx) filter module 71, a low noise amplifier 72, a transmitter/receiver (Tx/Rx) switch module 73, a local oscillation module 74, memory 75, a digital transmitter processing module 76, a digital-to-analog converter 78, a filtering/gain module 80, an up-conversion module 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transceiver functions, respectively. The digital receiver functions include, but are not limited to, digital intermediate frequency to baseband conversion, demodulation, constellation demapping, decoding, and/or descrambling. The digital transceiver functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array (FPGA), programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory (ROM), random access memory (RAM), volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated in FIG. 4, et. seq.

In operation, the radio 60 receives outbound data 94 from the host device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF signal typically will be in the frequency range of 100 kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation 83 provided by local oscillation module 74. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the Rx filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one skilled in the art will appreciate, the wireless communication device of FIG. 4 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device 18-32 and the digital receiver and transmitter processing modules 64 and 76 may be a common processing device implemented on a single integrated circuit. Further, memory 52 and memory 75 may be implemented on a single integrated circuit and/or on the same integrated circuit as the common processing modules of processing module 50 and the digital receiver and transmitter processing modules 64 and 76.

Figure 5:
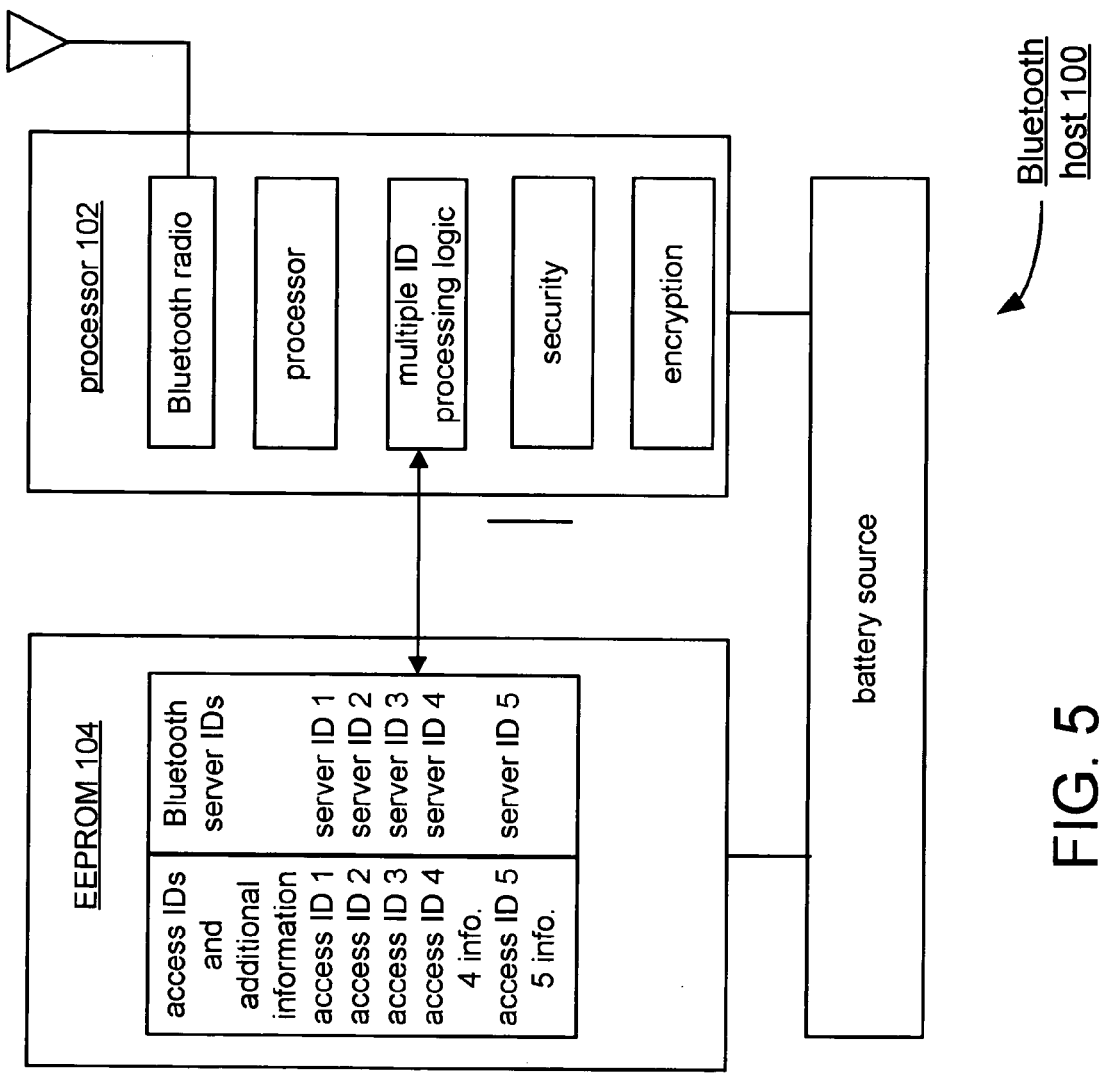
FIG. 5 is a functional block diagram of a Bluetooth host formed according to one embodiment of the present invention.

FIG. 5 is a functional block diagram of a Bluetooth host formed according to one embodiment of the present invention. A Bluetooth host 100 includes a processor 102 that is operatively coupled to communicate with memory 104. In the described embodiment of the invention, memory 104 is an EEPROM device. EEPROM 104 is arranged to store a plurality of access IDs and corresponding information that are mapped to Bluetooth service provider IDs. As described above, the access IDs, in one embodiment, comprise link keys and may be further comprised of combination keys, unit keys, master keys, and initialization keys, in any combination, for a corresponding Bluetooth service provider. EEPROM 104 further includes computer instructions that defines logic for the operation of processor 102 wherein, when executed by processor 102, creates logic blocks for security, encryption, and multiple ID processing capabilities of Bluetooth host 100.

One of average skill in the art understands how Bluetooth security and encryption works. As such, a description of the same will not be made herein. Significant to the invention, however, is that Bluetooth host 100 includes logic for processing a plurality of access IDs in relation to a plurality of Bluetooth service providers. As such, one Bluetooth host 100 is operable to communicate with any one of a plurality of different types of Bluetooth service providers. Generally, as will be described in greater detail below, Bluetooth host 100 receives a Bluetooth service provider ID which is used by the multi-ID processing logic of Bluetooth host 100 to determine a corresponding access ID and optionally, corresponding information. As such, Bluetooth host 100 may receive, referring again to FIG. 2, a Bluetooth service provider ID for any one of the Bluetooth service providers 08a-08e and may correspondingly provide, responsive thereto, an access ID that corresponds thereto.

Figure 6:
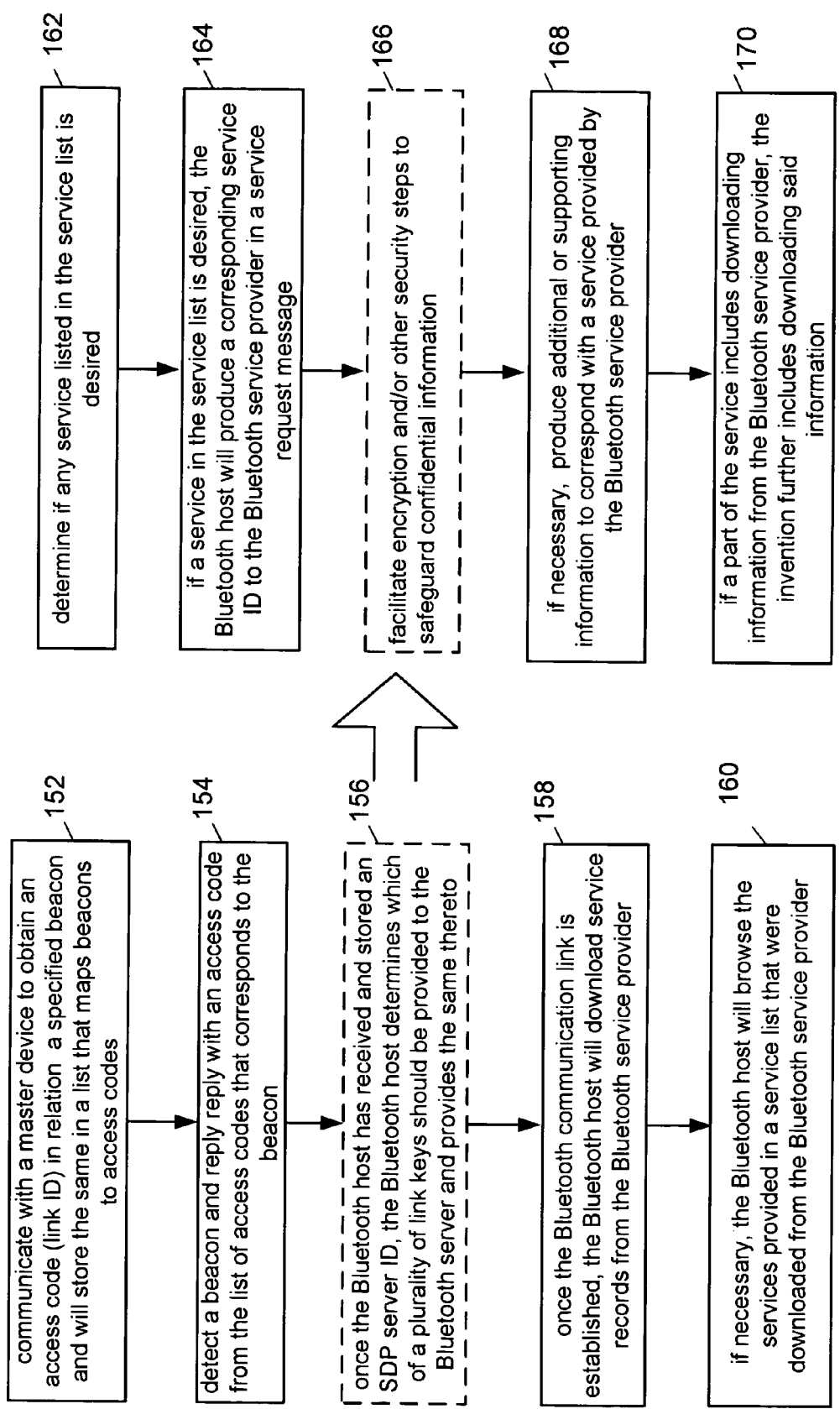
FIG. 6 is a flow chart of a method according to one embodiment of the present invention of a Bluetooth host device.

FIG. 6 is a flow chart of a method according to one embodiment of the present invention of a Bluetooth host device. The following discussion is from the perspective of a Bluetooth host that is set up to act as a slave and that communicates with a Bluetooth service provider that is set up to act as a master. The described method may readily be modified, however, to make the Bluetooth host a master and the Bluetooth service provider a slave as known by one of average skill in the art. Initially, a Bluetooth host communicate with a master device to obtain an access code (link ID) in relation a specified beacon and will store the same in a list that maps beacons to access codes (step 152). In one embodiment, the original setup includes the master transmitting a master ID to prompt the host device to receive and store the access ID in relation to the beacon. As is known, a Bluetooth master, here the Bluetooth service provider, periodically transmits a beacon to which host devices proximate thereto will respond. Accordingly, when the Bluetooth host detects a beacon, the Bluetooth host will reply with an access code from the list of access codes that corresponds to the beacon (step 154). In a prior art system, the Bluetooth host reply would include a permanently stored link key which the Bluetooth service provider would then authenticate. Once the Bluetooth host has received and stored the SDP server ID, the Bluetooth host determines which of a plurality of link keys should be provided to the Bluetooth server and provides the same thereto (step 156).

The above process facilitates the creation of a communication link between the Bluetooth server and the Bluetooth service provider. Once the Bluetooth communication link is established, the Bluetooth host will download service records from the Bluetooth service provider (step 158). Thereafter, if necessary, the Bluetooth host will browse the services provided in a service list that were downloaded from the Bluetooth service provider (step 160). The Bluetooth host then determines if any service listed in the service list is desired (step 162). If a service in the service list is desired, the Bluetooth host will produce a corresponding service ID to the Bluetooth service provider in a service request message (step 164). As a part of this, optionally, the Bluetooth host may facilitate encryption and/or other security steps to safeguard confidential information (step 166). Thereafter, if necessary, the Bluetooth host produces additional or supporting information to correspond with a service provided by the Bluetooth service provider (step 168). If a part of the service includes downloading information from the Bluetooth service provider, the invention further includes downloading said information (step 170).

The above method may be modified according to embodiment. For example, one alternate embodiment includes initially utilizing a semi-permanently stored link key or, more generally, access ID, for the Bluetooth device and then subsequently providing additional link keys, access IDs, or service IDs, to facilitate additional services. Moreover, while encryption was shown at step 168, above, it is understood that any portion of any communication may be encrypted, as is known by one of average skill in the art. For example, even the transmission of service records by the Bluetooth service provider may be encrypted for the sake of confidentiality.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention. For example, references to operation of a digital signal processor also may apply to baseband processors and vice-versa. Similarly, any combination of the teachings herein may be modified to achieve similar but different results.

What is claimed is:

1. A Bluetooth wireless transceiver host integrated circuit, comprising:
a Bluetooth protocol radio transceiver for a handheld host device that includes radio front-end circuitry and logic that generates radio frequency signals according to a Bluetooth communication protocol;
memory for storing a plurality of access IDs as well as service related access information in relation to Bluetooth server IDs;
a processor operatively coupled to communicate with the memory;
logic defining Bluetooth protocol operations including logic for providing a plurality of levels of security;
logic defining encryption operations;
logic for finding an access ID from the plurality of access IDs that corresponds to a received Bluetooth server ID; and
wherein the wireless transceiver host integrated circuit:
transmits an access ID to establish a Bluetooth communication link;
transmits, if required, service related access information to support a service;
maintains access ID and service related access information in relation to a plurality of Bluetooth communication device beacons; and
switches communications from one Bluetooth device that provides a service to another without having to re-establish a Bluetooth communication link.

2. The Bluetooth host integrated circuit of claim 1 further including logic for determining whether any additional information is stored and is to be produced to a Bluetooth server corresponding to the received Bluetooth server ID.

3. The Bluetooth host integrated circuit of claim 2 wherein the memory for storing the plurality of access IDs is EEPROM.

4. The Bluetooth host integrated circuit of claim 2 wherein the additional information is provided as a part of establishing a Bluetooth communication link.

5. The Bluetooth host integrated circuit of claim 2 wherein the additional information is provided after establishing a Bluetooth communication link.

6. The Bluetooth host integrated circuit of claim 2 wherein the Bluetooth host integrated circuit is formed within a watch.

7. The Bluetooth host integrated circuit of claim 2 wherein the Bluetooth host integrated circuit is formed within a pen.

8. The Bluetooth host integrated circuit of claim 2 wherein the Bluetooth host integrated circuit is formed within a badge.

9. The Bluetooth host integrated circuit of claim 2 wherein the Bluetooth host integrated circuit is formed within a smart credit card.

10. The Bluetooth host integrated circuit of claim 2 wherein the Bluetooth host integrated circuit is formed within decorative jewelry.

11. The Bluetooth host integrated circuit of claim 2 wherein the Bluetooth host integrated circuit is formed within a key.

12. The Bluetooth host integrated circuit of claim 2 wherein the Bluetooth host integrated circuit is operable to communicate with transceiver circuitry formed within a vehicle to provide access to the vehicle and to allow operation of the vehicle.

13. The Bluetooth host integrated circuit of claim 2 wherein the Bluetooth host integrated circuit is operable to communicate with transceiver circuitry formed within a point-of-entry access point to provide access through a controlled passageway.

14. The Bluetooth host integrated circuit of claim 2 wherein the Bluetooth host integrated circuit is operable to communicate with transceiver circuitry formed within a point-of-sale communication device to provide financial information to consummate a purchase.

15. The Bluetooth host integrated circuit of claim 2 wherein the Bluetooth host integrated circuit is operable to communicate with transceiver circuitry formed within a personal computer to provide one of controlled or unlimited access to data and programs within the personal computer.

16. A transceiver host integrated circuit, comprising:
radio transceiver front-end circuitry for a handheld host device operable to transmit and receive RF signals on one of a plurality of RF frequencies;
memory for storing a plurality of access IDs in relation to server IDs;
a processor operatively coupled to communicate with the memory;
logic defining Bluetooth protocol operations for establishing a Bluetooth communication link with a Bluetooth device that provides a service and further including logic for providing a plurality of levels of security;
logic defining wireless local area network protocol operations for establishing a wireless local area network protocol link;
logic defining encryption operations; logic for finding an access ID from the plurality of access IDs that corresponds to a received server ID; and
wherein the wireless transceiver host integrated circuit:
transmits an access ID to establish a Bluetooth communication link;
transmits, if required, service related access information to support a service;
maintains access ID and service related access information in relation to a plurality of Bluetooth communication device beacons; and
switches communications from one Bluetooth device to another without having to re-establish a Bluetooth communication.

17. The transceiver host integrated circuit of claim 16 further including logic for determining whether any additional information is stored and is to be produced to a Bluetooth server corresponding to the received server ID.

18. The transceiver host integrated circuit of claim 17 wherein the memory for storing the plurality of access IDs is LEPROM.

19. The transceiver host integrated circuit of claim 17 wherein the additional information is provided as a part of establishing a communication link.

20. The transceiver host integrated circuit of claim 17 wherein the additional information is provided after establishing a communication link.

21. A method for establishing a Bluetooth communication link within any one of a plurality of different types of Bluetooth servers, comprising:
detecting, in a handheld host device, a beacon transmitted by a Bluetooth communication device that provides a service, the beacon containing a Bluetooth server ID transmitted by a Bluetooth server;
retrieving a plurality of server access IDs from memory;
searching among the plurality of server access IDs to find an access ID that corresponds to the Bluetooth server ID;
transmitting the access ID to establish a Bluetooth communication link;
transmitting, if required, service related access information to support a service;
maintaining access ID and service related access information in relation to a plurality of Bluetooth communication device beacons; and
switching communications from one Bluetooth device that provides a service to another without having to re-establish a Bluetooth communication link.

22. A method for a Bluetooth transceiver, comprising:
searching for a beacon transmitted by a Bluetooth sewer;
extracting a sewer ID within the beacon and comparing the server ID to a plurality of stored sewer IDs stored in memory of a Bluetooth handheld host device;
determining a corresponding access ID;
obtaining a list of services from the Bluetooth server and selecting at least one service;
transmitting the access ID to establish a Bluetooth communication link;
transmitting, if required, service related access information to support a service;
maintaining access ID and service related access information in relation to a plurality of Bluetooth communication device beacons; and
switching communications from one Bluetooth device to another without having to re-establish a Bluetooth communication link.

23. The method of claim 22 further including browsing the list of services.

24. The method of claim 22 further including determining, based upon the selected service and the sewer ID, providing additional information in addition as a part of providing at least a portion of the two part ID.

25. The method of claim 22 wherein the corresponding access ID is provided as a part of a security key.

26. The method of claim 22 wherein the corresponding access ID is provided as a part of a link key.

27. The method of claim 22 wherein the corresponding access ID is provided as a part of a combination key.

28. The method of claim 22 wherein the corresponding access ID is provided as a part of a unit key.

29. The method of claim 22 wherein the corresponding access ID is provided as a part of a master key.

30. The method of claim 22 wherein the corresponding access ID is provided as a part of an initialization key.

* * * * *